United States Patent
Chowdhary et al.

(10) Patent No.: US 10,748,075 B2
(45) Date of Patent: Aug. 18, 2020

(54) METHOD AND APPARATUS FOR ENERGY EFFICIENT PROBABILISTIC CONTEXT AWARENESS OF A MOBILE OR WEARABLE DEVICE USER BY SWITCHING BETWEEN A SINGLE SENSOR AND MULTIPLE SENSORS

(71) Applicants: STMicroelectronics, Inc., Coppell, TX (US); STMicroelectronics International N.V., Amsterdam (NL)

(72) Inventors: Mahesh Chowdhary, San Jose, CA (US); Arun Kumar, New Delhi (IN); Ghanapriya Singh, New Delhi (IN); Kashif R. J. Meer, New Delhi (IN); Indra Narayan Kar, New Delhi (IN); Rajendar Bahl, New Delhi (IN)

(73) Assignees: STMicroelectronics, Inc., Coppell, TX (US); STMicroelectronics International N.V., Amsterdam (NL)

( * ) Notice: Subject to any disclaimer, the term of this patent is extended or adjusted under 35 U.S.C. 154(b) by 897 days.

(21) Appl. No.: 15/299,656

(22) Filed: Oct. 21, 2016

(65) Prior Publication Data
US 2018/0114133 A1 Apr. 26, 2018

(51) Int. Cl.
*G06F 16/90* (2019.01)
*H04L 12/24* (2006.01)
(Continued)

(52) U.S. Cl.
CPC .......... *G06N 7/005* (2013.01); *G06F 1/3287* (2013.01); *G06F 1/3296* (2013.01); *G06F 1/163* (2013.01)

(58) Field of Classification Search
CPC ..... G06N 7/005; G06F 1/3287; G06F 1/3296; G06F 1/163
(Continued)

(56) References Cited

U.S. PATENT DOCUMENTS 8,588,871 B1 * 11/2013 Arnold .............. H04W 52/0245
455/574
2005/0126274 A1 * 6/2005 Griesser ................ B60C 23/061
73/146
(Continued)

FOREIGN PATENT DOCUMENTS

| CN | 104460957 A | 3/2015 |
| CN | 104656898 A | 5/2015 |
| CN | 105630197 A | 6/2016 |

OTHER PUBLICATIONS

First Office Action and Search Report and co-pending CN Appl. No. 201710978770.7 dated Jun. 1, 2020 (8 pages).

*Primary Examiner* — Brandon S Cole
(74) *Attorney, Agent, or Firm* — Crowe & Dunlevy

(57) ABSTRACT

Disclosed herein is a method of operating an electronic device. The method includes activating a first sensing device, and determining a first probabilistic context of the electronic device relative to its surroundings. The method includes outputting the first probabilistic context, and determining a confidence measure of the first probabilistic context. Where the confidence measure of the first probabilistic context is below a threshold, the method includes activating a second sensing device, determining a second probabilistic context of the electronic device relative to its surroundings. outputting the second probabilistic context, and determining a confidence measure of the second probabilistic context. Where the confidence measure of the second probabilistic context is above the threshold, the second sensing device is deactivated and the method returns to determining the first probabilistic context.

29 Claims, 15 Drawing Sheets

(51) Int. Cl.
  *G06Q 20/06* (2012.01)
  *G06F 16/22* (2019.01)
  *G06K 9/00* (2006.01)
  *G06N 7/00* (2006.01)
  *G06F 1/3287* (2019.01)
  *G06F 1/3296* (2019.01)
  *G06F 1/16* (2006.01)

(58) Field of Classification Search
  USPC .................................................... 706/1–62
  See application file for complete search history.

(56) References Cited

U.S. PATENT DOCUMENTS

2015/0199224 A1* 7/2015 Mihnev ................. H04L 43/045
                                                                714/37
2018/0114133 A1* 4/2018 Chowdhary .......... G06F 1/3296

* cited by examiner

| | Walking | Cycling | Stationary | Stairs Up | Stairs Down | Jogging | Driving | Elevator Up | Elevator Down |
|---|---|---|---|---|---|---|---|---|---|
| Walking | 80.10 | 11.19 | 0.04 | 2.64 | 2.60 | 0.04 | 3.39 | 0.00 | 0.00 |
| Cycling | 3.87 | 82.90 | 6.55 | 2.71 | 0.78 | 0.27 | 2.31 | 0.37 | 0.24 |
| Stationary | 0.00 | 3.44 | 95.91 | 0.00 | 0.00 | 0.00 | 0.50 | 0.14 | 0.00 |
| Stairs Up | 2.55 | 2.55 | 0.39 | 89.22 | 3.53 | 0.39 | 0.00 | 1.37 | 0.00 |
| Stairs Down | 6.01 | 0.96 | 0.00 | 4.09 | 87.02 | 0.00 | 0.48 | 0.00 | 1.44 |
| Jogging | 0.00 | 0.00 | 0.00 | 0.00 | 0.00 | 100.00 | 0.00 | 0.00 | 0.00 |
| Driving | 0.00 | 3.14 | 7.07 | 0.79 | 0.34 | 0.00 | 87.99 | 0.34 | 0.34 |
| Elevator Up | 0.00 | 2.36 | 18.87 | 0.47 | 0.00 | 0.00 | 0.00 | 75.00 | 3.30 |
| Elevator Down | 0.00 | 0.49 | 16.26 | 0.00 | 0.99 | 0.00 | 0.49 | 1.48 | 80.30 |

FIG. 13
(Table 1)

| Threshold of entropy of Accelerometer sensor | Overall Accuracy (%) | Accelerometer sensor only switched on time instance (%) | Accelerometer & Barometer both sensors switched on time instance (%) | Energy consumed for MAV over total duration (Joules) |
|---|---|---|---|---|
| 1.00 | 93.26 | 0.11 | 99.89 | 1.56 |
| 1.10 | 93.26 | 0.20 | 99.80 | 1.56 |
| 1.20 | 93.21 | 0.28 | 99.72 | 1.56 |
| 1.30 | 93.15 | 0.36 | 99.64 | 1.56 |
| 1.40 | 92.91 | 0.55 | 99.45 | 1.56 |
| 1.50 | 92.91 | 0.98 | 99.02 | 1.55 |
| 1.60 | 92.78 | 1.82 | 98.18 | 1.55 |
| 1.70 | 92.51 | 2.96 | 97.04 | 1.55 |
| 1.80 | 92.21 | 5.33 | 94.67 | 1.54 |
| 1.90 | 91.48 | 8.15 | 91.85 | 1.53 |
| 2.00 | 90.38 | 12.69 | 87.31 | 1.51 |
| 2.10 | 89.27 | 18.43 | 81.57 | 1.49 |
| 2.20 | 87.97 | 25.93 | 74.07 | 1.46 |
| 2.30 | 86.49 | 35.16 | 64.84 | 1.42 |
| 2.40 | 83.65 | 47.12 | 52.88 | 1.38 |
| 2.50 | 81.35 | 59.54 | 40.46 | 1.33 |
| 2.60 | 78.03 | 72.03 | 27.97 | 1.28 |
| 2.70 | 74.34 | 82.50 | 17.50 | 1.24 |
| 2.80 | 71.08 | 90.26 | 9.74 | 1.21 |
| 2.90 | 68.56 | 96.01 | 3.99 | 1.19 |
| 3.00 | 67.16 | 99.31 | 0.69 | 1.18 |

FIG. 14
(Table 2)

| Threshold of entropy of Barometer sensor (bits) | Overall Accuracy (%) | % frames barometer only is switched on | % frames when both accelerometer and barometer are switched on | Energy consumed by sensors over total duration (Joules) |
|---|---|---|---|---|
| 1.00 | 93.20 | 0.31 | 99.69 | 1.55 |
| 1.10 | 93.20 | 0.41 | 99.59 | 1.55 |
| 1.20 | 93.17 | 0.59 | 99.41 | 1.55 |
| 1.30 | 93.10 | 0.73 | 99.27 | 1.54 |
| 1.40 | 93.04 | 0.91 | 99.09 | 1.54 |
| 1.50 | 92.95 | 1.36 | 98.64 | 1.54 |
| 1.60 | 92.71 | 1.93 | 98.07 | 1.53 |
| 1.70 | 92.48 | 2.63 | 97.37 | 1.52 |
| 1.80 | 92.39 | 3.38 | 96.62 | 1.52 |
| 1.90 | 92.28 | 4.20 | 95.80 | 1.51 |
| 2.00 | 91.93 | 5.52 | 94.48 | 1.49 |
| 2.10 | 91.11 | 8.17 | 91.83 | 1.47 |
| 2.20 | 89.93 | 13.19 | 86.81 | 1.41 |
| 2.30 | 87.52 | 21.22 | 78.78 | 1.33 |
| 2.40 | 83.82 | 34.00 | 66.00 | 1.19 |
| 2.50 | 79.09 | 50.39 | 49.61 | 1.02 |
| 2.60 | 73.17 | 68.65 | 31.35 | 0.82 |
| 2.70 | 66.79 | 85.93 | 14.07 | 0.64 |
| 2.80 | 63.02 | 94.39 | 5.61 | 0.55 |
| 2.90 | 61.54 | 97.76 | 2.24 | 0.51 |
| 3.00 | 60.63 | 99.66 | 0.34 | 0.49 |

FIG. 15
(Table 3)

METHOD AND APPARATUS FOR ENERGY EFFICIENT PROBABILISTIC CONTEXT AWARENESS OF A MOBILE OR WEARABLE DEVICE USER BY SWITCHING BETWEEN A SINGLE SENSOR AND MULTIPLE SENSORS

TECHNICAL FIELD

This disclosure relates to the method and apparatus for determining a mobile or wearable device user's context in an energy efficient manner while providing a desired level of context classification accuracy.

BACKGROUND

Portable electronic devices such as smartphones, smartwatches, other wearables, and tablets are ever more popular in the world today. Certain functions of these devices depend on the device having knowledge of the device's orientation, or of conditions of the environment in which the device currently resides. For example, a smartphone may rotate its user interface from a portrait view to a landscape view based upon the orientation in which the smartphone is held. As another example, a smartwatch may activate its display or alter the brightness of its display based upon the orientation in which the smartwatch is held, or based upon the ambient light in the environment in which the smartwatch resides, respectively. Such portable electronic devices may also log the physical activity of a user. For example, a smartphone or smartwatch may count the number of steps taken by a user.

In order to determine the orientation of the device or conditions of the environment in which the device resides, sensors such as accelerometers and gyroscopes are employed. Typically, the electronic device includes a system on chip (SOC) that receives raw data from the sensors, and then determines the device orientation or conditions of the environment.

While this approach of using multiple sensors yields accurate data and enables the electronic device to perform commercially desirable functions, such use of multiple sensors may consume an undesirable amount of power. Therefore, further development is still desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure relates to the method and apparatus for determining a mobile or wearable device user's context in an energy efficient manner while providing a desired level of classification accuracy. The energy optimization is based on determining the sensors to be used at a given time and accordingly switching on/off or putting them selectively in normal/low power mode. The algorithmic framework is flexible to allow trade-off between energy efficiency and context detection accuracy. The computational architecture outputs the probability of some or all the different contexts given the data from one or more sensors. The probability output is used to determine the degree of confidence in the detected context class and thereby determine whether additional sensors are to be switched on to improve the confidence, or whether some sensor(s) are to be switched off as their data is/are not useful in further improving the confidence of the classification result. For example, if the context refers to the type of motion activity that the user of a mobile or wearable device is engaged in, then the suite of embedded sensors used for this task may include the accelerometer, barometer, gyroscope, and microphone. The number of sensors to be used at a given time may be determined from the perspective of energy efficiency and context classification accuracy.

Disclosed herein is a method of operating an electronic device. The method includes activating a first sensing device, and determining a first probabilistic context of the electronic device relative to its surroundings. The method includes outputting the first probabilistic context, and determining a confidence measure of the first probabilistic context. Where the confidence measure of the first probabilistic context is below a threshold, the method includes activating a second sensing device, determining a second probabilistic context of the electronic device relative to its surroundings, outputting the second probabilistic context, and determining a confidence measure of the second probabilistic context. Where the confidence measure of the second probabilistic context is above the threshold, the second sensing device is deactivated and the method returns to determining the first probabilistic context.

Also disclosed herein is a sensor chip mounted on a printed circuit board (PCB) and electrically coupled to a system on chip (SoC) mounted on the PCB via at least one conductive trace. The sensor chip includes first and second sensing devices, and a control circuit. The control circuit is configured to activate the first sensing device, determine a first probabilistic context of the electronic device relative to its surroundings, and output the first probabilistic context. The control circuit is also configured to determine a confidence measure of the first probabilistic context. Where the confidence measure of the first probabilistic context is below a first threshold, the control circuit is configured to activate the second sensing device, determine a second probabilistic context of the electronic device relative to its surroundings, output the second probabilistic context, and determine a confidence measure of the second probabilistic context. Where the confidence measure of the second probabilistic context is above a second threshold, the control circuit deactivates the second sensing device and returns to determining the first probabilistic context.

BRIEF DESCRIPTION OF THE DRAWINGS

FIG. 13 is a first table showing a confusion matrix for motion activity classes obtained using the probabilistic MAP output with features obtained from accelerometer and barometer data with switching between one and two sensors using the conditional entropy criterion. The overall accuracy obtained is 86.49% for detection of all the motion activity classes.

FIG. 14 is a second table showing variation of overall accuracy with change in the switching threshold of conditional entropy. The table also tabulates the percentage of time only the accelerometer is switched on verses the percentage of time when both the accelerometer and barometer are switched on, and an estimate of energy consumed.

FIG. 15 is a third table showing variation of overall accuracy with a change in the switching threshold of conditional entropy. The table also tabulates the percentage of time only the barometer is switched on verses the percentage of time when both the accelerometer and barometer are switched on, and the estimate of energy consumed.

DETAILED DESCRIPTION

Figure 1:
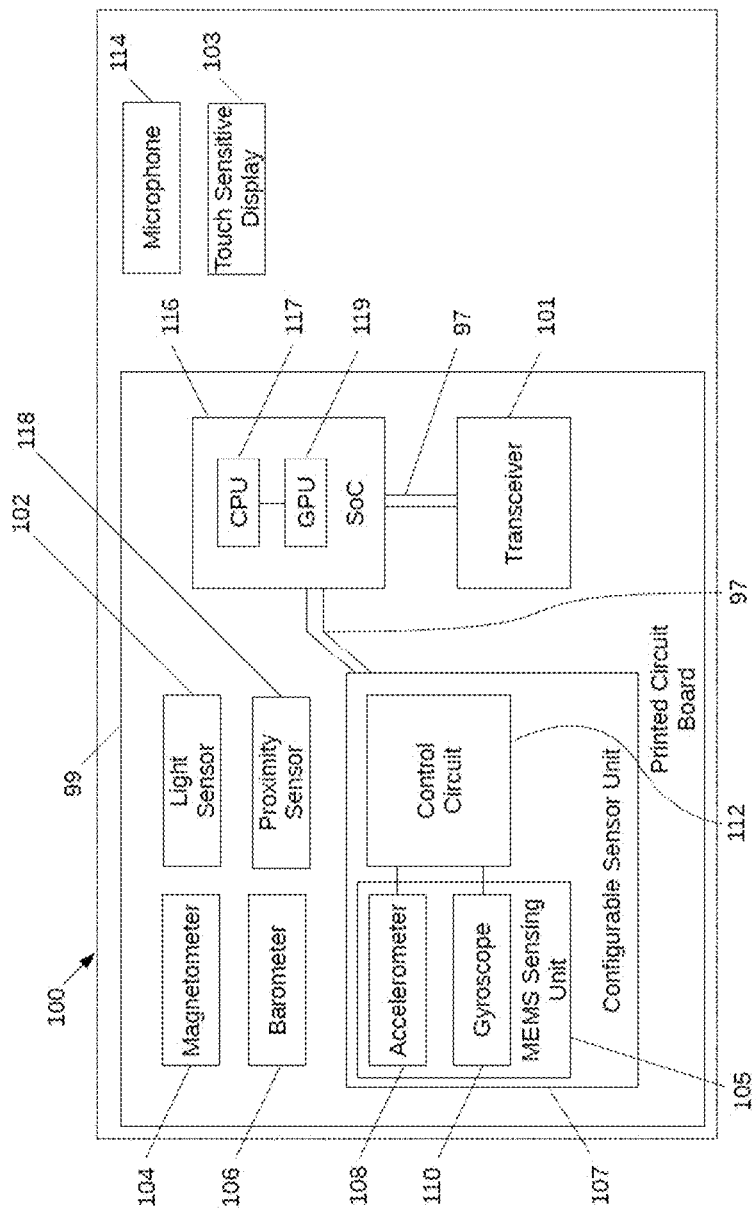
FIG. 1 is a schematic block diagram of an electronic device including a reconfigurable sensor unit that may be utilized to perform the sensing techniques and methods described herein.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Operation in accordance with this disclosure will first be explained in general, and thereafter will be described in greater detail.

With the improvement in MEMS sensor technologies, their small size and relatively low cost, they are becoming ubiquitous in consumer electronic devices of everyday use such as mobile phones, smartwatches, and other wearable devices. These sensors along with the embedded processors on such devices have paved the way for the determination of context awareness of the device user that may be based on motion activity detection, voice activity detection, spatial environment detection etc. To sense context, there is a need for relevant data coming continuously from one or more compatible sensors. Due to this, there is an incessant drain of energy in the mobile/wearable device. These devices are usually small and lightweight, which puts a constraint on the battery that is integrated in the device. Therefore, energy optimization is an important consideration in the task of context detection.

A wide range of sensors can be used for different context awareness tasks such as accelerometer, barometer, gyroscope, magnetometer, microphone, camera, global position satellite (GPS) receiver, light sensor, proximity sensor, radiofrequency (RF) sensors, gas sensors etc. Often times, the same context awareness task can be accomplished with heterogeneous sensors each with different power consumption levels and providing different accuracies. The tasks may also be accomplished by using multiple heterogeneous sensors with multi-sensor data fusion that may provide higher levels of context classification accuracy. For example, a user's motion activity may be detected independently by an accelerometer, barometer, gyroscope, or microphone with varying levels of accuracy. Given that some or all of the sensors that are useful in providing a specific kind of context awareness information e.g., a user's motion activity are available on the device, a reasonable objective criterion will be to maximize the accuracy of context classification and simultaneously minimize the power consumption. The lowest power-consuming sensor may not provide the maximum accuracy for a context detection task whereas multiple heterogeneous sensors will typically give more reliable and accurate context inferences at the cost of higher power consumption.

In this document, a computational method is given for determining a mobile/wearable device user's context with one or more sensors with the objectives of achieving a specified level of accuracy of context inferences and minimizing the energy consumption for the task. This will involve adaptively switching on or off certain sensors. The framework allows for flexibility in tuning the energy efficiency with trade-off for the detection accuracy. The computational architecture provides probabilistic information about the context such as motion activities, through heterogeneous sensor measurements that may include the accelerometer, barometer, gyroscope and microphone, voice activities through microphone and microphone array, and spatial environment through microphone, barometer and UV sensor, embedded on the mobile/wearable device. The output information is provided in the form of the probability of each context class given the observation data from the sensor(s). A logic is provided to adaptively determine whether one or more of the sensors should be used depending on a measure of confidence derived from the probability outputs that takes into consideration the two objectives of achieving the specified accuracy of context classification and minimizing the energy consumption.

In prior methods for energy efficiency in context awareness tasks, the use of supplementary low-power processors in addition to the main processor of a mobile device has been suggested to take care of all context awareness processing and activity. The low power processor has the task of continuous sensing of context while the main processor is made to wake up only when there is computationally intensive work to be performed. In another approach, the context classes to be detected are mapped a priori to one or more sensors and accordingly the sensors are made to wake up to detect whether the particular class is present or absent. The task of energy efficiency has also been addressed by performing context recognition intermittently when changes occur in context monitoring. Since the energy consumed by a sensor is directly proportional to the sampling rate of the sensor, a dynamic algorithm has been used to suit the sampling rate of the sensor depending on the past context events.

With initial reference to FIG. 1, an electronic device 100 upon which the various techniques and methods of this disclosure may be performed is now described. The electronic device 100 may be a smartphone, tablet, smartwatch, or other wearable device. The electronic device 100 includes a printed circuit board (PCB) 99 having various components mounted thereon. Conductive traces 97 printed on the PCB 99 serve to electrically couple the various components together in a desired fashion.

A system on chip (SoC) 116, which comprises a central processing unit (CPU) 117 coupled to a graphics processing unit (GPU) 119, is mounted on the PCB 99. Coupled to the SoC 116 are a transceiver 101 via which the SoC 116 can communicate with remote servers over the internet, and a touch sensitive display 103 via which the SoC 116 may display output and receive input. A variety of sensors are coupled to the SoC 116, including a light sensor 102 for determining the level of ambient light in the environment in which the electronic device 100 resides, a magnetometer 104 used to determine the orientation of the electronic device 100 with respect to the magnetic field of the Earth, a barometer 106 used to determine the air pressure in the environment (and thus, the altitude of the electronic device 100), a microphone 114 used to detect audible noises in the environment, and a proximity sensor 118 used to determine proximity of the user with respect to the electronic device 100.

A configurable sensor unit 107 is mounted on the PCB 99 spaced apart from the SoC 116, and coupled thereto by the conductive traces 97. For illustrative purposes only, for example, the configurable sensor unit 107 includes an accelerometer 108 and/or gyroscope 110 coupled to a control circuit 112. The accelerometer 108 is used for determining accelerations experienced by the electronic device 100, and the gyroscope 110 is used to determining an orientation of the electronic device 100 with respect to the environment. It should be understood that any now existing or future developed type of sensors could be used with this disclosure, the scope of which is not limited by the type of configurable sensors used. The configurable sensor unit 107 may be formed from discrete components and/or integrated components and/or a combination of discrete components and integrated components, and may be formed as a package.

As illustrated in FIG. 1 as an example, configurable sensor unit 107 is not a portion of the SoC 116, and is a separate and distinct component from the SoC 116. The sensor unit 107 and the SoC 116 are separate, distinct, mutually exclusive chips mounted on the PCB 99 at different locations and coupled together via the conductive traces 97. It should be understood that this example configuration is just one optional configuration and SOC 116 and/or the features/function thereof could be integrated with the sensor unit 107, which is also included in the scope of this disclosure.

In operation, the SoC 116 may acquire data from the various sensors 102, 103, 104, 106, 114, and 118 at an acquisition rate, and may process the data so as to determine a context of the electronic device 100 relative to its environment. The acquisition rate for some of these various sensors, in some operating scenarios, may be relatively low due to the nature of the contexts to be determined from these sensors not necessitating a higher acquisition rate. Therefore, power consumption as a result of acquisition of data from these various sensors may be relatively low. Contexts will be explained in detail.

On the other hand, the contexts to be determined from some other sensor, for example, in some operating scenarios, the accelerometer 108 and/or the gyroscope 100 may involve the use of a higher acquisition rate than the other sensors. Therefore, to save power, a control circuit 112 of the configurable sensor unit 107 that consumes less power than the SoC 116 may be used to perform acquisition of data from the accelerometer 108 and/or the gyroscope 110, and may perform some processing of that data.

In operation, the control circuit 112 acquires data from the accelerometer 108 and/or the gyroscope 110, and processes the data so as to generate a context of the electronic device 100 relative to its surroundings. This processing is performed by the control circuit 112 using a processing technique operating in accordance with the configuration data received as input. The processed data is then output by the control circuit 112 to the SoC 116 for use thereby.

The context of the electronic device 100 may be where on the user's body it is carried (i.e. in pocket, in hand, in holster), a current method of locomotion of the user (i.e. running, walking, driving, bicycling, climbing stairs, riding a train, riding a bus), human voice activity (i.e. silence, face-to-face talking, phone conversation), spatial environment (i.e. street, nature, garden, beach, stadium, office, mall, home, lecture room), an orientation of the electronic device 100 with respect to gravity. Another example context may be movement of the electronic device 100 in a gesture, such as a user raising a smartwatch in to a position to view the screen thereof, shaking the electronic device 100, double tapping the touch sensitive display 103 of the electronic device 100, rotating the electronic device 100 either clockwise or counterclockwise, and swiping the touch sensitive display 103 to the left, right, top, or bottom.

A general algorithmic framework is described for energy efficient context classification using either a single sensor (for example, the accelerometer 108) or multiple sensors (for example, the accelerometer 108 and the barometer 106). The algorithmic framework produces the posterior probability of each context class as a function of time that can be used for context classification with a specified level of accuracy while ensuring optimum utilization of sensor(s) 102, 103, 104, 106, 114, and 118 on the device 100 from the perspective of energy consumption.

The algorithmic framework is flexible to allow a trade-off between energy efficiency and context classification accuracy. The advantage of using multiple heterogeneous sensors 102, 103, 104, 106, 114, and 118 is that it increases the classification accuracy due to their independent measurements, but the multiple sensors 102, 103, 104, 106, 114, and 118 also increase the overall energy consumed. The number of sensors 102, 103, 104, 106, 114, and 118 to be used at a given time may be determined from the perspective of energy efficiency and classification accuracy.

The method of operation disclosed herein includes first data from a single sensor (one of 102, 103, 104, 106, 114, and 118) to compute the posterior probability of each of the context classes using windowed frames of data. Suitable logic can be used to determine the context class from these probabilities for each frame. The set of each of these probabilities is called a "posteriorgram". The posteriorgram is used to determine a confidence measure regarding the classification result. If the confidence measure is above a (fixed or adaptive) threshold, then the single sensor continues to be used to determine the posteriorgrams, otherwise another sensor (another of 102, 103, 104, 106, 114, and 118) is switched on in addition to, or instead of, the first sensor to determine the posterior probability of the context classes using multi-sensor data fusion. The confidence measure is again determined from the posteriorgram to further decide if the same sensors should be used, or an additional sensor (another of 102, 103, 104, 106, 114, and 118) should be switched on, or whether a sensor being used should be switched off. In this framework, it is feasible to tradeoff between the desired accuracy of context detection and the energy consumed by the sensors to achieve the desired level of accuracy, by appropriately changing the threshold of the confidence measure that is monitored on a frame-by-frame basis and used to decide on the number of sensors to be used.

Figure 2:
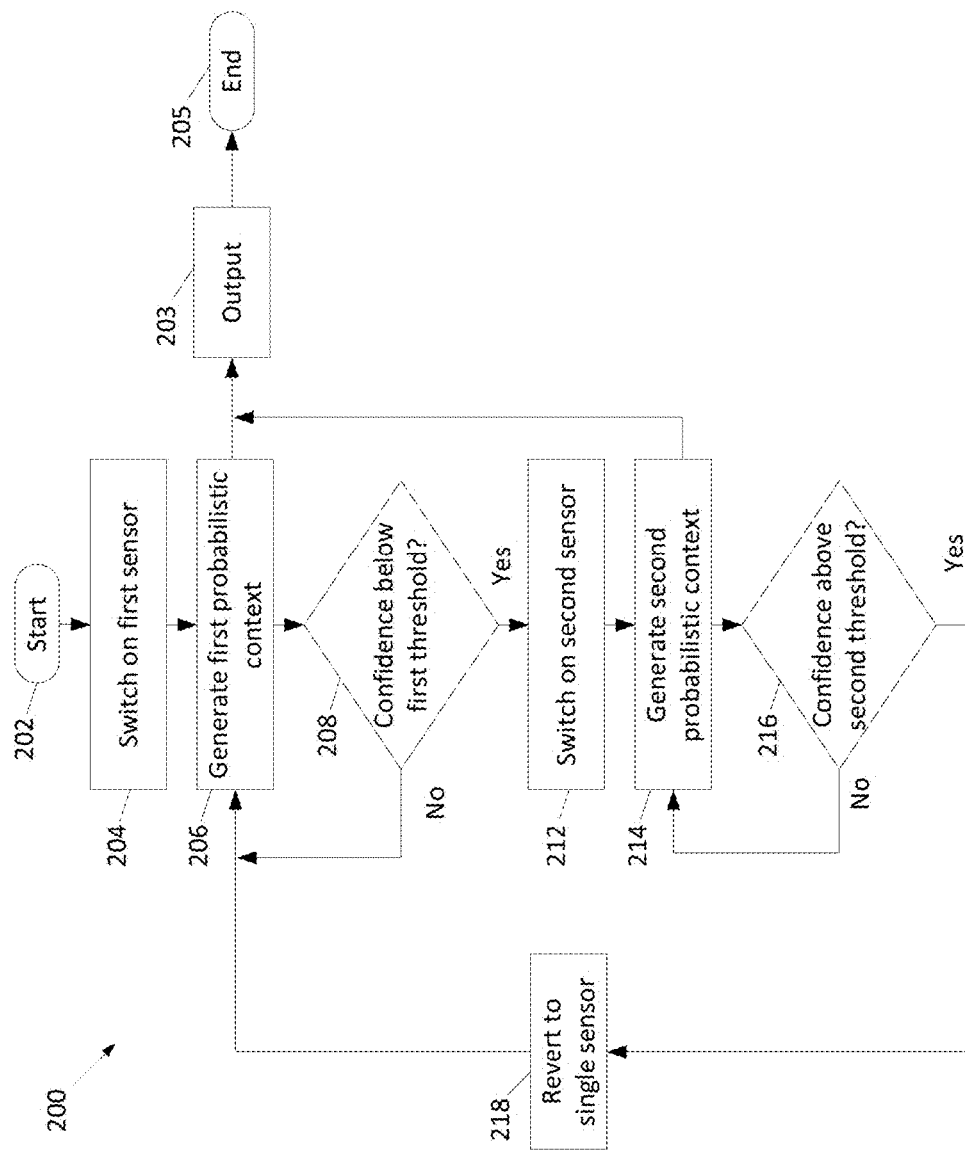
FIG. 2 is a basic level representation of the framework for energy efficient probabilistic context awareness of a mobile or wearable device user, where the device has two sensors.

Shown in FIG. 2 is a flowchart 200 of the method for energy efficient context detection of a mobile device 100 user using one or two sensors chosen from among 102, 103, 104, 106, 114, and 118. The flowchart 200 has subroutine blocks 206 and 214 for determining probabilistic content output, the details of which are shown in the flowcharts 206 and 214 of FIGS. 3A-3B. While the algorithm is shown and described for the case of switching between one sensor and two sensors, the framework can be extended with the same logic for switching involving more than two sensors.

Figures 3A, 3B:
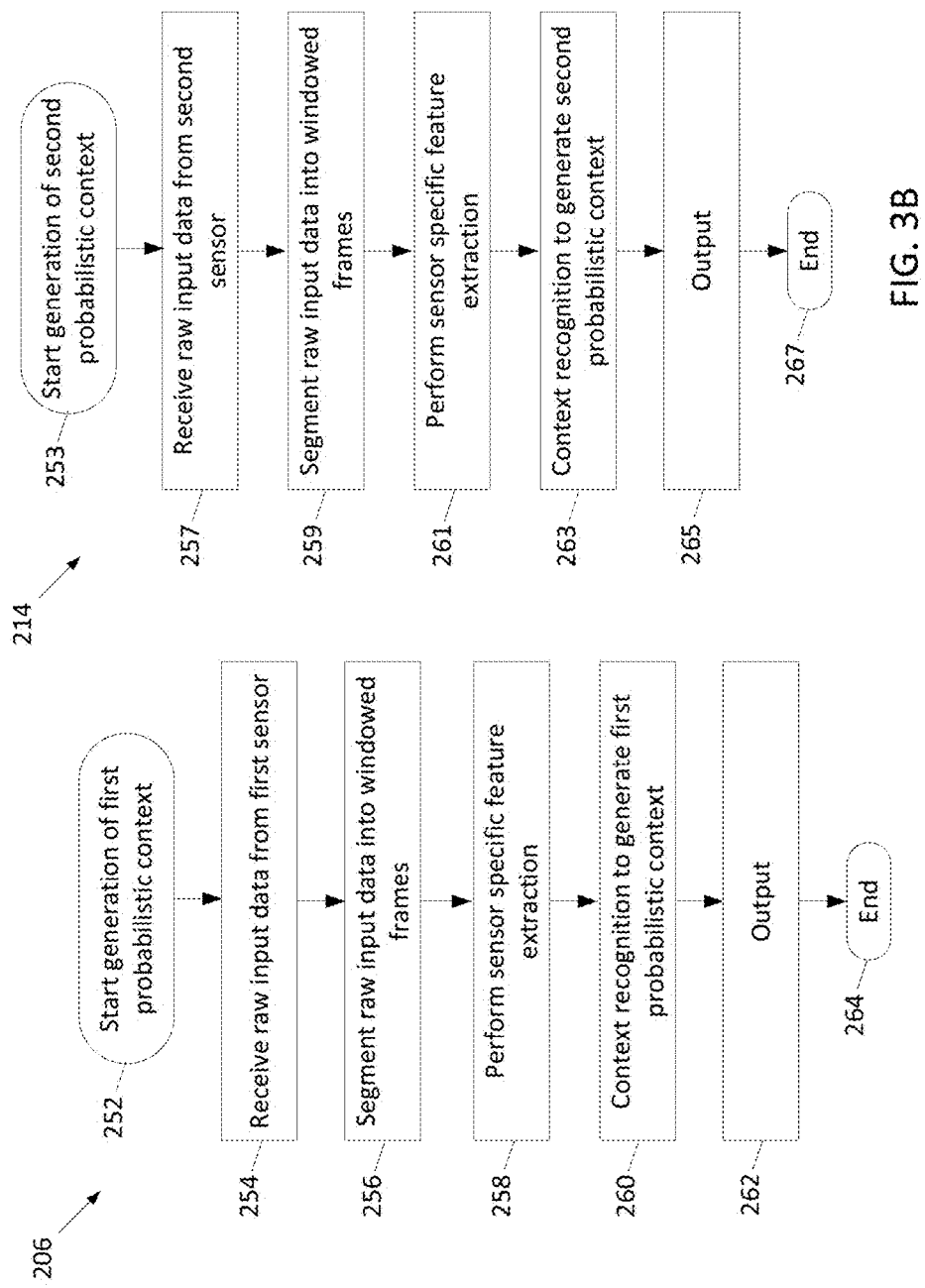
FIG. 3A is a flowchart illustrating steps for obtaining the probability of different context classes using input data from a first sensor.
FIG. 3B is a flowchart illustrating steps for obtaining the probability of different context classes using input data from a second sensor and optionally the first sensor.

Referring initially to FIG. 2, after the start at Block 202, a first sensor is switched on at Block 204, and first probabilistic context is generated therefrom at Block 206. Referring additionally to FIG. 3A, generation of the first probabilistic context at Block 206 is now described. Raw digital data is acquired from the first sensor at Block 254. This data is pre-processed and buffered into time windowed frames at Block 256. Sensor specific features are extracted from each frame at Block 258. The features include class-discriminating information contained in the data. These features are used with probabilistic classification to obtain the posterior probability output for each class, with the result being is expressed as a vector called the "posteriorgram", and that is considered the first probabilistic context as described above at Block 260. The first probabilistic context is then output at Block 262 for use in the rest of this technique, as well as output at Block 203 for use by the SoC 116 or control circuit 112.

Since the context classification is done using the posteriorgram by applying a probabilistic classification algorithm such as probabilistic neural network, probabilistic multi-class support vector machines, etc., a measure of confidence can be evaluated based on the posterior probability of all the contexts given the sensor data at Block 208. For energy-optimized use of sensors under the constraint of a desired level of accuracy, the confidence measure is evaluated for a single sensor based posteriorgram at Block 208, and a decision to switch on a second sensor is taken if the confidence is low (below a threshold $T_1$) at Block 212.

Second probabilistic context is then generated at Block 214. Referring additionally to FIG. 3B, generation of the second probabilistic context at Block 206 is now described. Raw digital data is acquired from the second sensor at Block 257. This data is pre-processed and buffered into time windowed frames at Block 259. Sensor specific features are extracted from each frame at Block 261. The features include class-discriminating information contained in the data. These features are used with probabilistic classification to obtain the posterior probability output for each class, and that is considered the second probabilistic context as described above at Block 263. The second probabilistic context is then output at Block 265. The second probabilistic context is then output at Block 265 for use in the rest of this technique, as well as output 203 for use by the SoC 116 or control circuit 112 at Block 203.

A decision to switch off the second sensor is taken at Block 218 if the confidence is high (above a threshold $T_2$) at Block 216. Where the confidence remains low, the second sensor remains on and the second probabilistic context (is continually generated with both the first and second sensor on at Block 214 until the confidence is high.

The thresholds $T_1$ and $T_2$ described above are based on the degree of classification accuracy required, and these in turn determine the level of energy efficiency that can be attained.

The above method based on the evaluation of a confidence measure for switching between one and two sensors, or between a single sensor and a different single sensor, can be extended to the case of switching between n and (n+1) sensors in general. The sole 'limitation' on the maximum number of sensors can be either due to the number of sensors 102, 103, 104, 106, 114, and 118 on the device 100, or the sensors and sensor combinations for which suitable classifier techniques or pattern libraries are available, or the maximum energy which could be spent on context detection that may been specified by the user or the device 100.

Further details of the device 100, as well as the calculation of the contexts described above or below, or any calculations, vectors, or posteriorgrams calculated above or below, may be found in copending applications: U.S. Ser. No. 14/749,118, entitled RECONFIGURABLE SENSOR UNIT FOR ELECTRONIC DEVICE; U.S. Ser. No. 15/132,521, entitled RECONFIGURABLE SENSOR UNIT FOR ELECTRONIC DEVICE; U.S. Ser. No. 14/974,402, entitled METHOD FOR CALIBRATION OF MAGNETIC SENSOR; and U.S. Ser. No. 15/074,188, entitled METHOD AND APPARATUS FOR DETERMINING PROBABILISTIC CONTEXT AWARENESS OF A MOBILE DEVICE USER USING A SINGLE SENSOR AND/OR MULTI-SENSOR FUSION. These applications are all hereby incorporated by reference.

For illustration purposes, consider the motion activity contexts of a user that are grouped in a motion activity vector:

Motion Activity Vector (MAV)=[stationary; walking; jogging; going upstairs; going downstairs; elevator up elevator down; bicycling; driving; none of these]'.

The MAV has the following properties:
i) One "class" or element in each vector is possible at a given time i.e., the elements are mutually exclusive.
ii) The "none of these" class in each vector represents the remaining classes of each vector that are not explicitly incorporated as elements. This allows the sum total of probability of the elements of a vector to be equal to one, that is mathematically relevant. Also, this makes the vector representation flexible so that new classes can be explicitly incorporated in the respective vectors as required, that will change the makeup of the "none of these" class of that vector.

The posterior probability of each motion activity given the data from one or more sensors is the corresponding posteriorgram of the MAV. Let it be named as the Motion Activity Posteriorgram (MAP).

Figure 4:
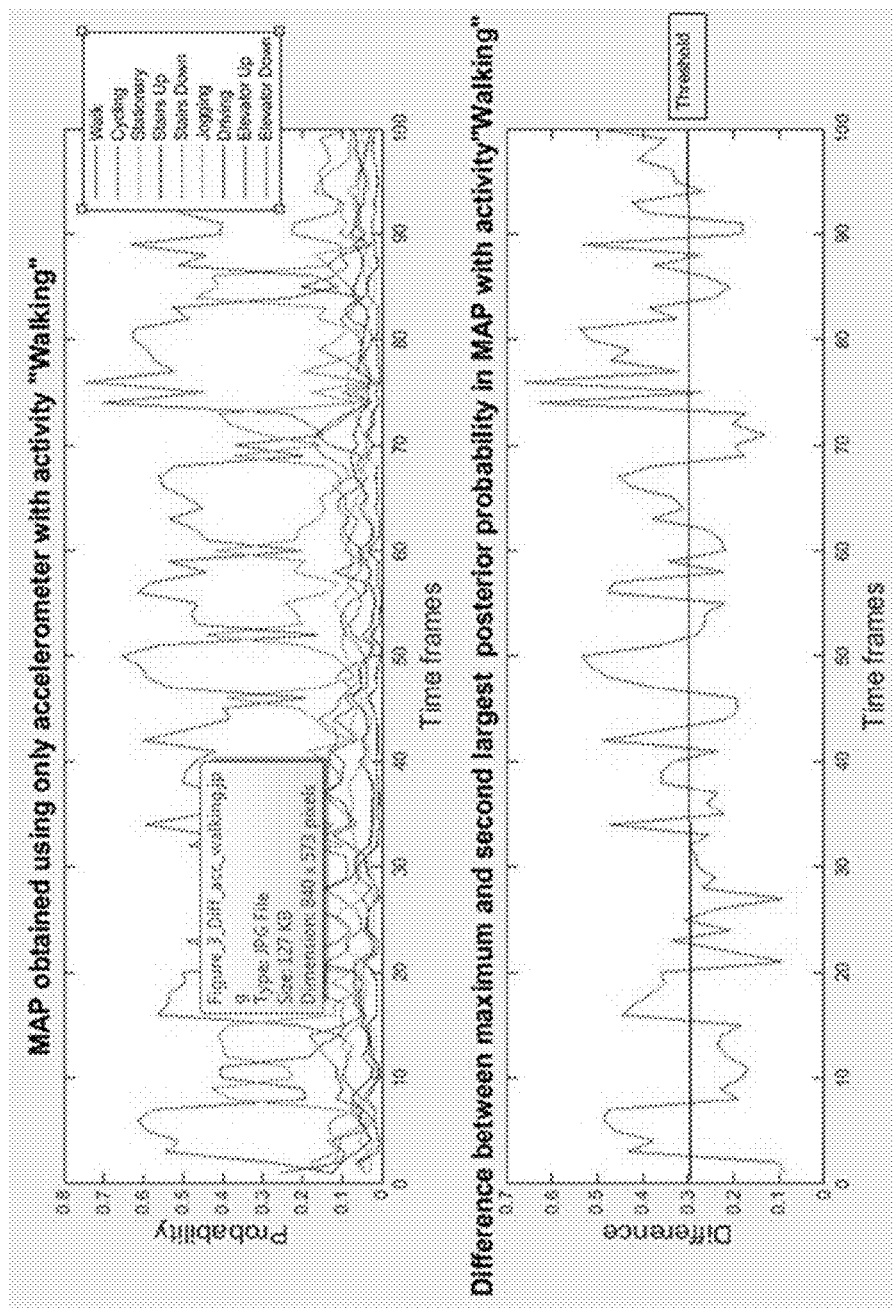
FIG. 4 is a graph illustrating posterior probabilities for motion activity classes (forming a Motion Activity Posteriorgram) as a function of time, and the difference between the highest and second highest posterior probabilities for the activity "walking".

There can be different confidence measures for switching from a single sensor to two sensors and vice-versa. FIG. 4 depicts the case when the confidence measure is the difference between the highest and the second highest posterior probabilities in the MAP for a given frame. The degree of confidence in the classification result based on the highest probability can be determined from the difference between this probability value and the next largest probability value. If this difference is large, then the confidence in the result is high, while if the difference in the two probability values is small, then the confidence in the classification result is low. This confidence measure has been used to switch from a single sensor to two sensors and vice-versa.

The difference between the highest and the second highest posterior probabilities in the posteriorgram is taken and compared with an a priori chosen switching threshold for making the decision. At the start, a single sensor is switched on and its data is used to evaluate the posteriorgram from which the difference between the two highest probability values is obtained. The first subplot of FIG. 4 shows the posteriorgram obtained from a single sensor i.e. the accelerometer. The second subplot demonstrates the difference between the highest and the second highest posterior probability values in the posteriorgram that is compared with an a priori threshold.

Figure 5:
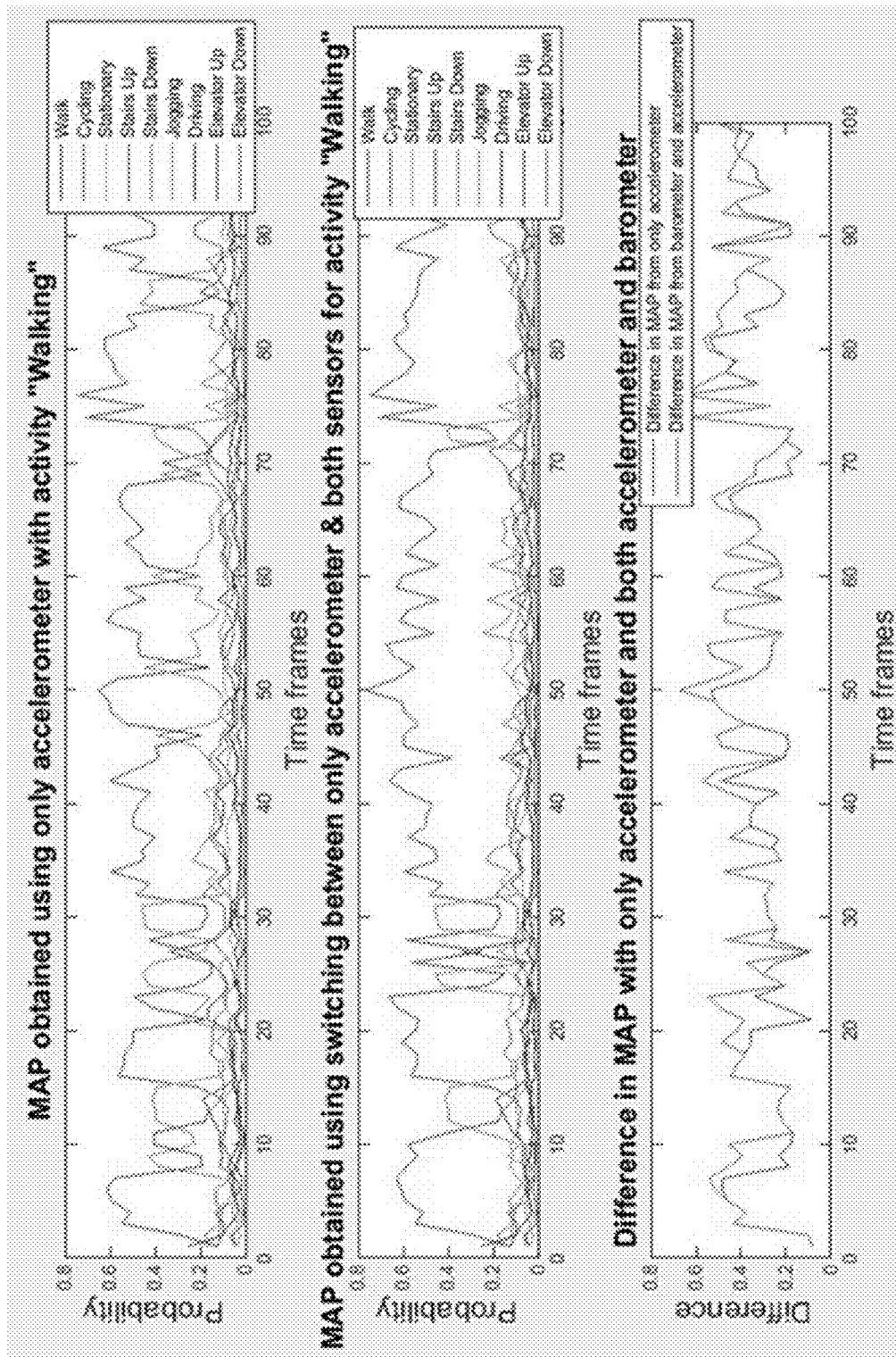
FIG. 5 is a graph illustrating posterior probabilities for the motion activity classes as a function of frames of data obtained using either an accelerometer only, or both the accelerometer and a barometer with switching between one sensor (accelerometer) and two sensors (both accelerometer and barometer). The criterion used is the difference of highest two probabilities in each frame with a switching threshold of 0.3. The lowest plot shows the respective probability differences when only one sensor is used, or both sensors are used, to obtain the posterior probabilities.

FIG. 5 shows the utility of the difference of the highest two probability values of the posteriorgram vector as the confidence measure for switching between one and two sensors. The top subplot shows the posterior probabilities for the motion activity classes as a function of frames obtained using accelerometer while the middle subplot shows both accelerometer and barometer with switching between one sensor (accelerometer) and two sensors (both accelerometer and barometer). The criterion used is the first threshold is equal to second threshold which is the difference of highest two probabilities in each frame with a switching threshold of 0.3. If the difference decreases below 0.3, then the context detection is switched from single sensor to two sensors and vice-versa. As can be observed by comparison between the top subplot and the middle subplot, the correct identification of the context increases after switching from a single sensor, i.e. accelerometer, to two sensors i.e., accelerometer and barometer.

The frame numbers 46, 52, and 60 exhibit erroneous highest posterior probability when the context is detected using only the accelerometer but as the threshold criterion is crossed, the change is made to two sensors to acquire the motion activity data. In this particular instance, if the classifier has wrongly classified an activity and the difference between the highest and the second highest posterior probabilities in MAP is greater than the threshold, the second sensor is still not switched on leading to incorrect result in the final posteriorgram. If the difference decreases below the switching threshold of 0.3, then the context detection is switched from a single sensor to two sensors.

The lowest subplot shows the respective probability differences when only one sensor (accelerometer) is used or when both sensors are used to obtain the posterior probabilities. From this subplot it is seen that the confidence increases when using both the sensors compared to when one sensor is used.

The sum of posterior probabilities of all activities in a posteriorgram is equal to 1. So, the range of the difference between the highest and second highest probability values will lie between 0 and 1. If the threshold difference $D_1$ is set to 1, then both the sensors would be switched on. Alternately, if the threshold difference $D_1$ is set to 0, then only a single sensor will be switched on.

Figure 6:
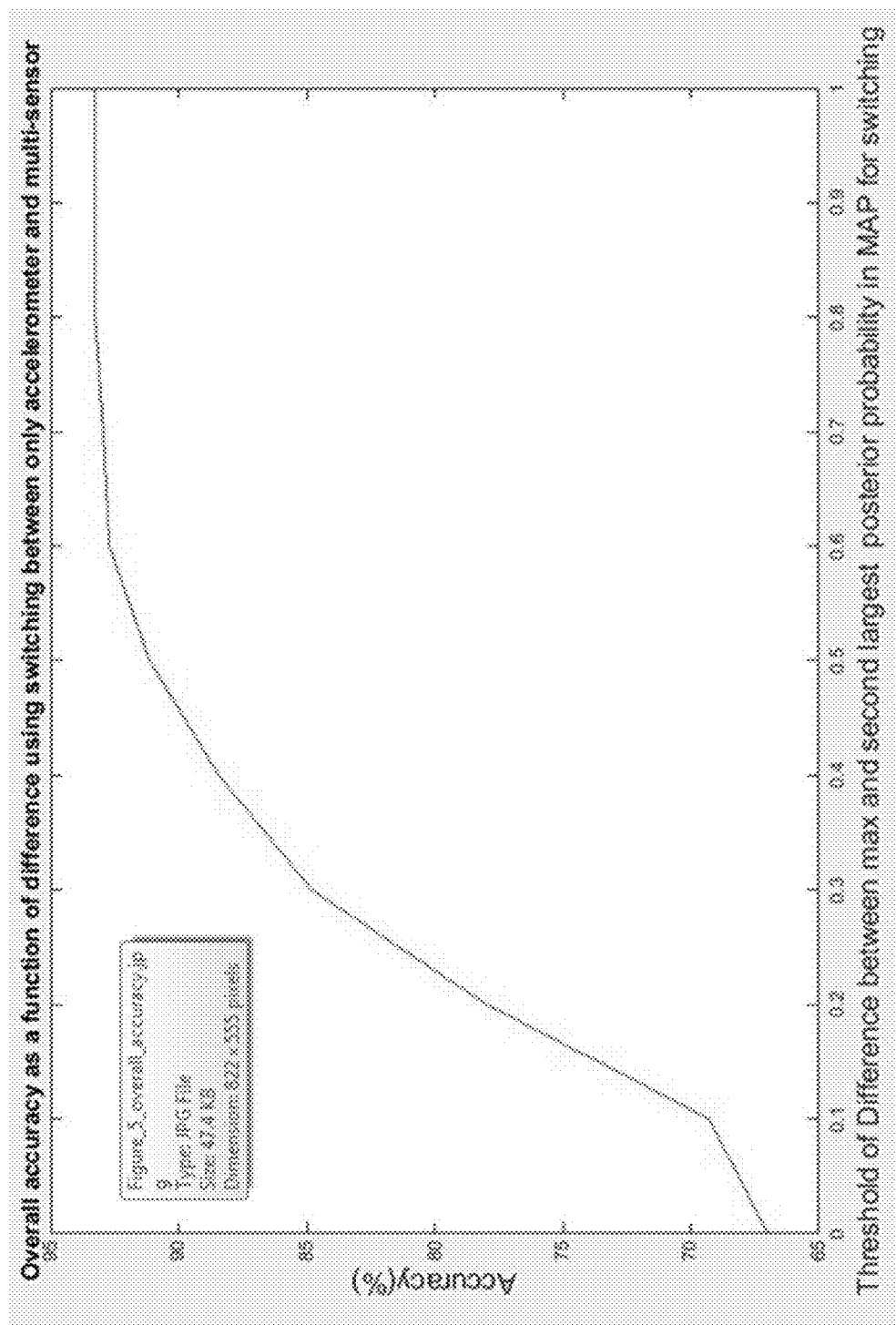
FIG. 6 is a graph illustrating overall accuracy as a function of the switching threshold in the difference between the maximum and the second largest posterior probability in the motion activity posteriorgram when switching is done between only an accelerometer sensor and both an accelerometer and barometer.

FIG. 6 shows the overall accuracy of motion activity classification as a function of the switching threshold in the difference between the highest and the second highest posterior probability values in the motion activity posteriorgram when switching is done between only accelerometer sensor and both accelerometer and barometer. When $D_1$ is set to 1, the average classification accuracy is 93% whereas when $D_1$ is set to 0, the average classification accuracy is 67%. The switching threshold $D_1$ is decided based on the competing desires of maximizing classification accuracy and minimizing sensor energy consumption.

Another information theoretic criterion for switching between a single sensor and multiple sensors is the conditional entropy, H. It quantifies the average amount of uncertainty in the outcome of a random variable "class" given another random variable or random vector "features" taking a value Z, determined from the data in a given frame. The conditional entropy is defined as, $$H(\text{class} \mid Z_i) = \sum_{j=1}^{M} P(\text{class}_j \mid Z_i) \log P(\text{class}_j \mid Z_i)$$

where M is the number of classes in MAV.

The conditional entropy is limited to lie between 0 and $\log_2 M$, where M is the number of classes being considered. The maximum value of H is obtained when all the classes are equiprobable, which is the maximum level of uncertainty, and hence, provides the minimum confidence in the classification outcome. A large value of the conditional entropy indicates greater uncertainty and vice-versa. The conditional entropy obtained from the posteriorgram is a measure of confidence of the classification result, and its value exceeding a threshold $T_1$ can be used as a criterion to switch from one sensor to two sensors and vice-versa. It is also applicable to the case of switching between n and (n+1) sensors in general.

Figure 7:
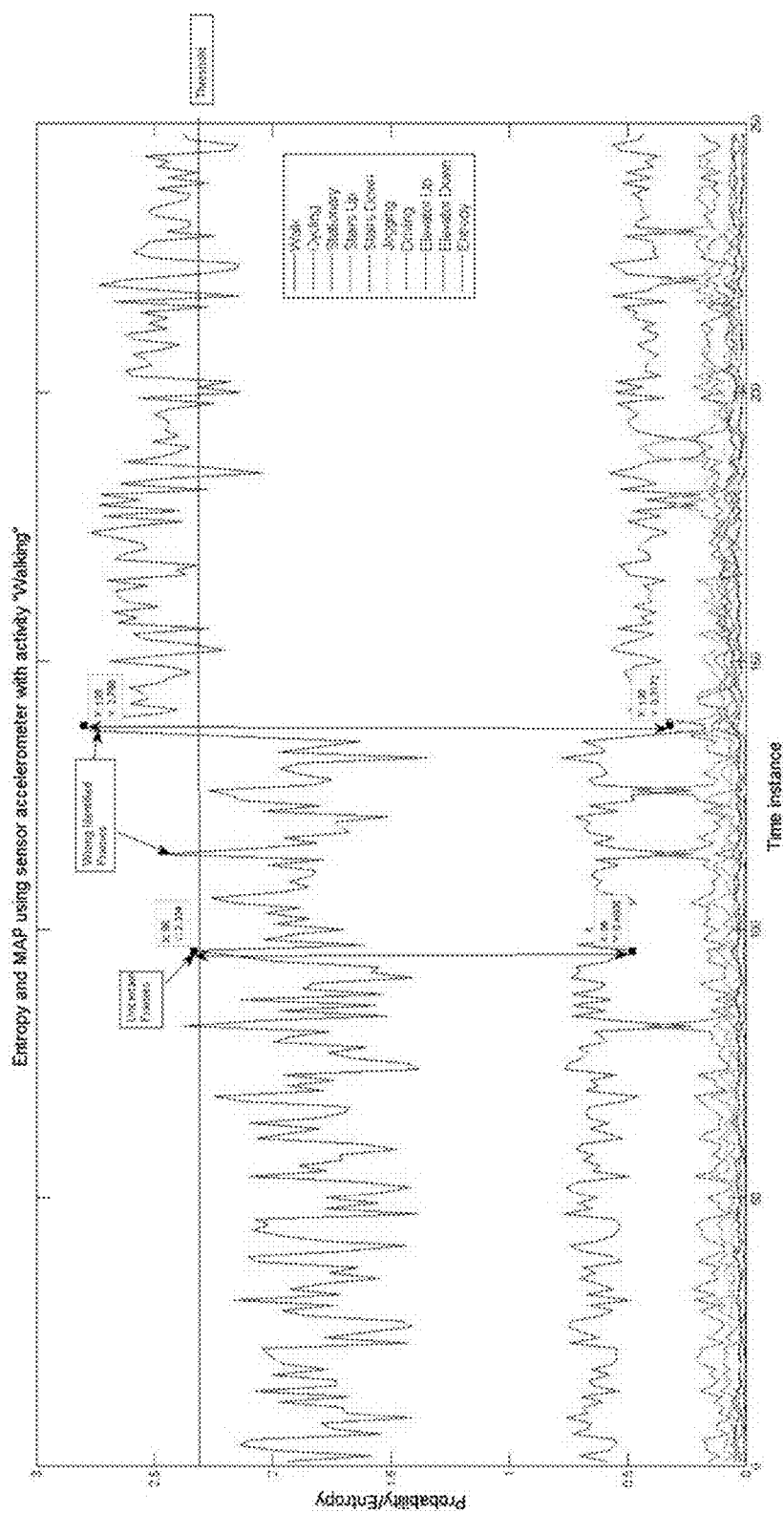
FIG. 7 is a time evolution graph of entropy (top yellow plot) that is used as a criterion of confidence in the motion activity posteriorgram that is used for motion activity classification. The posterior probabilities obtained using only accelerometer data are shown for the different activities also when the actual activity is "walking". The solid horizontal line shows the conditional entropy threshold of 2.3 bits.

FIG. 7 shows the conditional entropy derived from each frame's posteriorgram for the motion activity vector. The posterior probabilities obtained using accelerometer data are shown for the different activities also when the actual activity is "walking". The solid horizontal line shows the conditional entropy of 2.3 bits. It gives a measure of confidence in the classification result. It can be seen that the conditional entropy increases at frame 140 and mostly remains above the threshold, when the maximum probability corresponding to the activity "walking" decreases.

Initially, a single tri-axial accelerometer 108 is switched on. The data is sampled at 50 Hz and time-windowed data frames of 5 seconds are extracted with consecutive frames being obtained after a shift of 2 seconds. The 17-dimensional feature vector used per frame includes maxima, minima, mean, root-mean-square, 3 cumulative features, and $10^{th}$ order linear prediction coefficients. To derive features of cumulative, sorted time domain samples of each 5 seconds frame length is taken. From the sorted time domain data the following mean are calculated from particular range:

1. Mean Minima: is defined as the mean of first 15% of the sorted data of the frame.
2. Mean Middle: is defined as the mean of the sorted data of the frame from 30% to 40%.
3. Mean Maxima: is defined as the mean of the sorted data of the frame from 80% to 95%.

The above features are given to a trained probabilistic support vector machine (SVM) classifier using a Directed Acyclic Graph that gives the posteriorgram as output. The Motion Activity Posteriorgram (MAP) using accelerometer data for the activity "walking" is shown in FIG. 7. The confidence in the posteriorgram as the basis for classification is evaluated using the conditional entropy measure.

If a threshold $T_1$ is fixed at 2.3 bits, the time-windowed frames for which the conditional entropy increases above $T_1$ are considered as frames for which the confidence in the classification result is not achieved. Hence, a second sensor, i.e. the barometer 106, may be switched on. The frames for which the conditional entropy is below $T_1$ are considered as frames for which the confidence in the classification result is achieved using only a single sensor i.e. the accelerometer. The threshold $T_1$ is decided based on the competing requirements of maximizing classification accuracy and minimizing sensor energy consumption.

Figure 8:
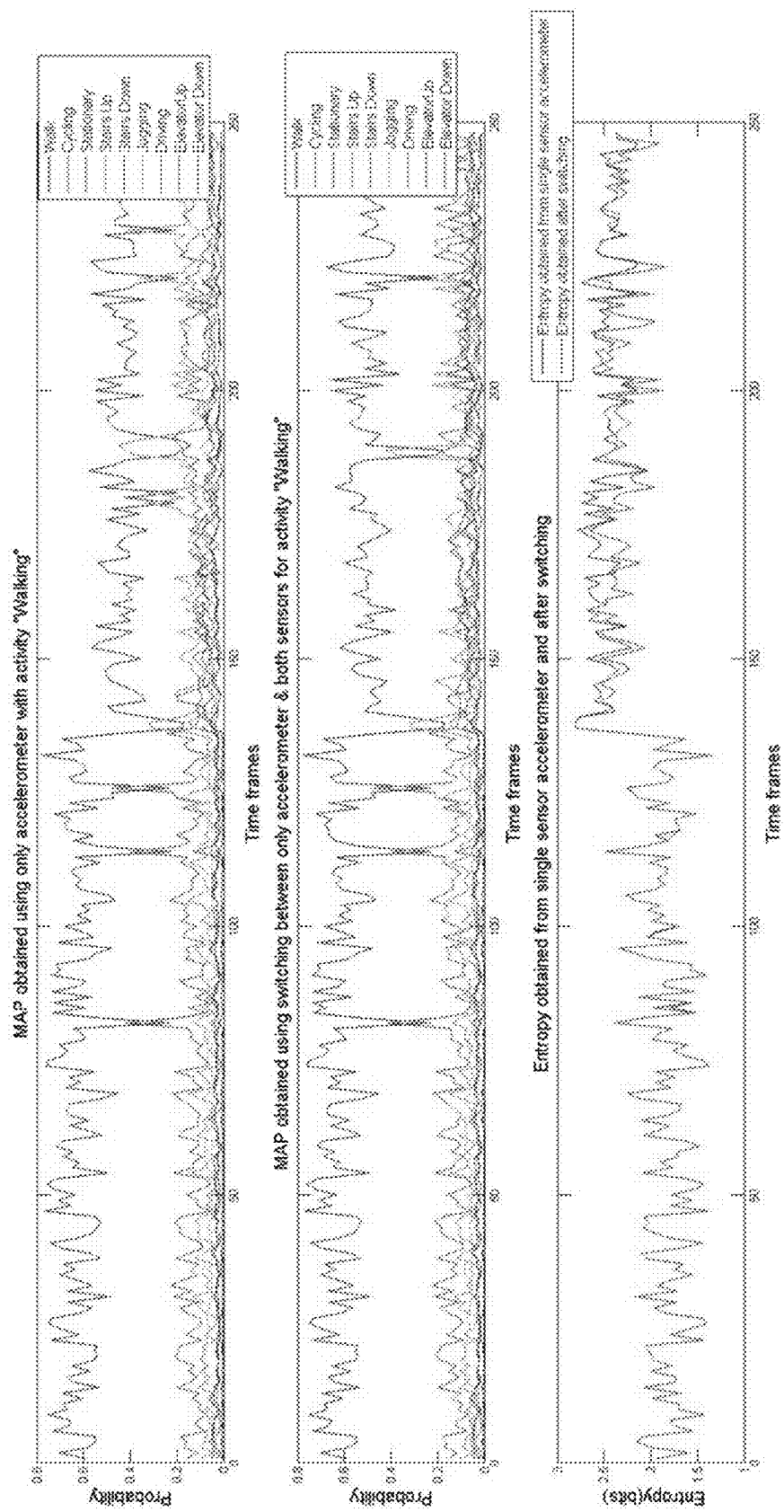
FIG. 8 is a graph of posterior probabilities for the motion activity classes as a function of frames obtained using either the accelerometer only (upper plot) or both the accelerometer and barometer (middle plot) with switching between one sensor i.e., only the accelerometer and two sensors i.e., both the accelerometer and barometer. The criterion used is the conditional entropy that is shown in the lower plot for data from accelerometer only and from two sensors after switching. The threshold for switching is 2.3 bits.

FIG. 8 shows the conditional entropy obtained using the accelerometer 108 to the exclusion of other sensors, and after switching to two sensors, the MAP obtained from just the accelerometer and after switching, from both accelerometer and barometer. The first subplot shows the time evolution graph of MAP obtained from single sensor i.e. accelerometer. The conditional entropy obtained from the single sensor is compared against an a priori threshold, where first threshold is equal to second threshold, which is taken as 2.3 in this case. As the value of the conditional entropy increases above 2.3 bits, both the sensors are switched on. The second subplot shows the MAP obtained when switching is done between single sensor and both sensors. The conditional entropy values increase significantly after about 140 frames. In this case, it is due to a change in position of the mobile phone by the user from the trouser pocket to the in-hand position. Due to the increase in the conditional entropy and a resulting loss of confidence in the classification result, the second sensor is switched on to aid in the motion activity classification task. The third subplot illustrates the entropy obtained from a single sensor i.e., the accelerometer, and the entropy obtained after switching to two sensors. This subplot shows that after switching on the second sensor, the confidence in the result increases and correspondingly the conditional entropy decreases. It can be observed at the frames 179 and 230, the class "walking" is wrongly classified using a single sensor accelerometer since the corresponding conditional probability of walking in the two frames is not the maximum. The conditional entropy at these particular frames is greater than the threshold of 2.3 bits. Hence, both accelerometer 108 and barometer 106 are switched on. It can be observed that after switching on both the sensors, the activity class "walking" is correctly classified.

Table 1 shown in FIG. 13 lists the confusion matrix that results when the conditional entropy switching criterion is used to switch between accelerometer 108, and accelerometer 108 and barometer 106. The features obtained from a single sensor or multiple sensors are used by the probabilistic SVM classifier using the DAG approach to obtain the posteriorgram. At first, a single sensor is switched on and the posteriorgram is estimated. The conditional entropy is then measured as a confidence measure. If it increases above a set threshold the second sensor is switched on to improve the confidence in the classification result that is based on the posteriorgram output. The rows in the confusion matrix give the true motion activity classes while the columns give the predicted activity classes. The diagonal values of the table represent the percentage of correct decisions for the respective classes while the off-diagonal values represent the erroneous decisions. The overall accuracy of 86.49% for the motion activity classes is achieved when the threshold is 2.3 bits.

As the conditional entropy threshold for switching is increased, there is an increase in the number of frames for which a single sensor is switched on and a decrease in the number of frames for which two sensors are switched on. This results in lower energy consumption at the cost of lower classification accuracy.

For sensor energy consumption analysis, the STMicroelectronics LSM6DS3 accelerometer and LPS25H pressure sensor can be used. The LSM6DS3 accelerometer has a supply voltage of 1.8V, and current consumption in normal mode is 70 μA. It thus consumes 126 μW in the normal mode. In the power down mode, the power consumption is 10.8 μW. The pressure sensor LPS25H has a power consumption of 42.5 μW in the normal mode and 0.85 μW in the power down mode.

Table 2 shown in FIG. 14 gives the variation of overall classification accuracy as the conditional entropy based switching threshold is varied. If the conditional entropy of each frame is below the threshold, then the accelerometer is switched on and is in normal mode while the barometer is powered down. Thus, in this condition, the power consumed is 126 μW by the accelerometer and 0.85 μW by the barometer. If the conditional entropy increases above the threshold, then both accelerometer and barometer are switched on and are in normal mode. Thus, in this condition the power consumed is 126 μW by the accelerometer and 42.5 μW by the barometer, resulting in total power consumption of 168.5 μW.

The percentage of frames when the accelerometer is switched on verses the percentage of frames when both the accelerometer and barometer are switched on varies with the switching threshold. The corresponding estimate of the energy consumed for total duration and the classification accuracy based on the resulting MAP (from one or two sensors as the case may be for each frame) is also tabulated. In this illustrative example, the total duration of 307 minutes comprising of all the activities of the MAV are used.

As the switching threshold is increased, two sensors are switched on for a lesser number of frames resulting in lower classification accuracy. The energy consumed over the duration when the threshold is 3 bits is 75.64% relative to when the threshold is set to 1 bit. The corresponding accuracies are 67.16% and 93.26% for 3 bits and 1 bit threshold respectively.

From Table 2, it can be seen that for 2% decrease in accuracy of performance results in reduction of approximately 2.5% energy consumption. Correspondingly, a 5% decrease in accuracy reduces energy consumption by approximately 4%.

Table 3 shown in FIG. 15 illustrates the variation in overall accuracy with a change in the switching threshold for the case when switching is done between barometer as the single sensor, and barometer and accelerometer as the two sensors. If the conditional entropy of each frame is below the threshold, then the barometer is switched on and is in normal mode while the accelerometer is powered down. Thus, in this condition the power consumed is 10.8 µW by the accelerometer and 42.5 µW by barometer, resulting in a total power consumption of 53.3 µW. Alternately, if the entropy is above the particular threshold, then both accelerometer and barometer are switched on and are in normal mode. Thus, in this condition the power consumed is 126 µW by accelerometer and 42.5 µW by barometer, resulting in a total power consumption of 168.5 µW.

When the switching threshold is set to 3 bits, in 99.66% of frames the barometer is switched on to the exclusion of other sensors and the classification accuracy is 60.63%. Whereas, when the threshold is decreased to 1 bit, both the accelerometer and barometer are switched on for 99.69% frames, and the classification accuracy increases to 93.20%. At the same time, the energy consumed when the switching threshold is 3 bits is 31.61% relative to when the switching threshold is 1 bit. The corresponding accuracies are 60.63% and 93.20% for 3 bits and 1 bit threshold respectively.

From Table 3, it can be seen that a 2% decrease in accuracy of performance results in reduction of approximately 5% in energy consumption, while a 5% decrease in accuracy reduces energy consumption by approximately 13%.

Figure 9:
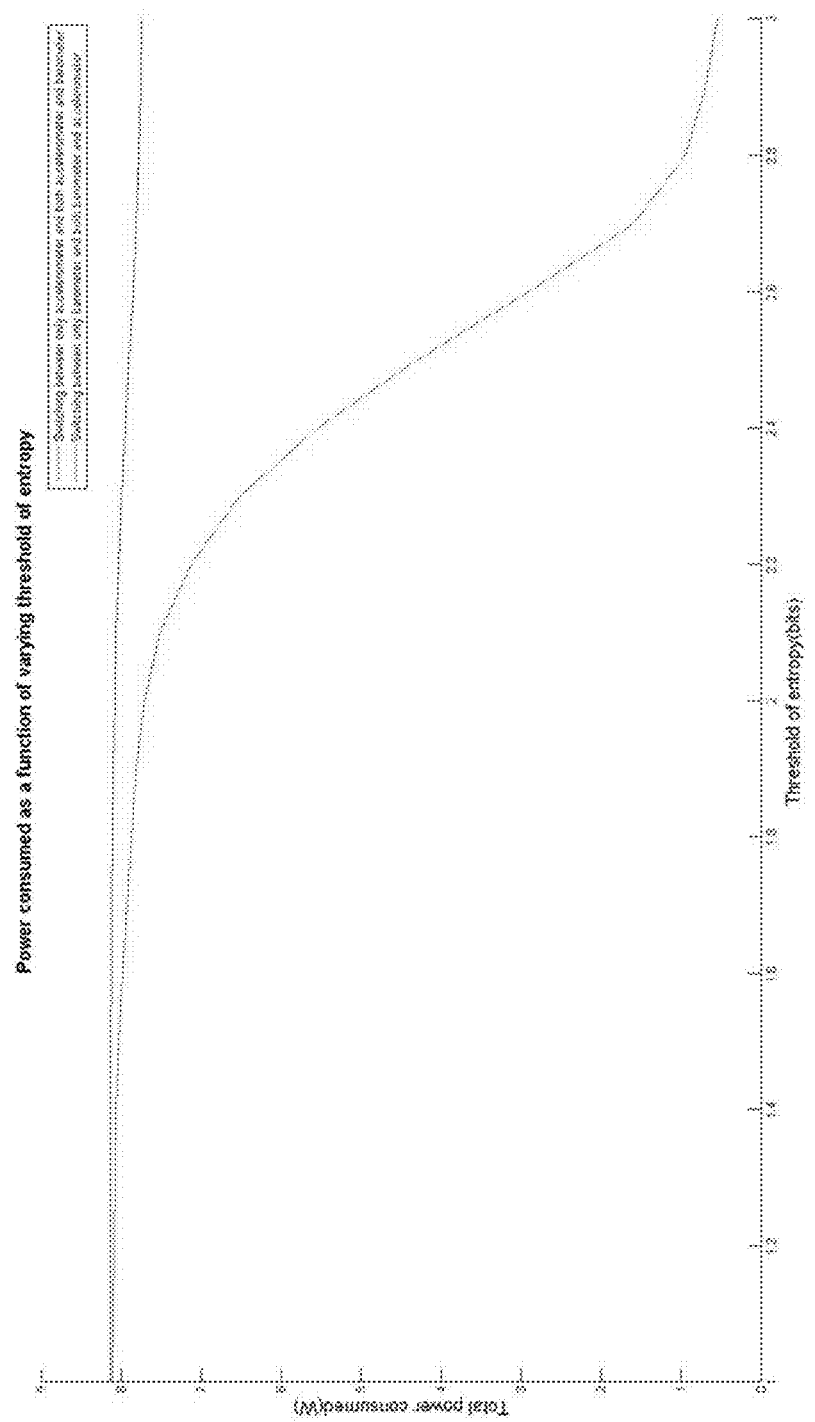
FIG. 9 is a graph showing a comparison of energy consumption as a function of the threshold value for the conditional entropy switching criterion for two switching cases.

FIG. 9 gives an estimate of the energy consumed when the criterion used is conditional entropy and the threshold is varied from 1 bit to 3 bits. The energy consumption is calculated for activities in the motion activity vector for total duration of 307 minutes. The comparison is done between two cases: i) just the accelerometer switched on compared to both sensors switched on, and ii) just the barometer switched on to both sensors switched on. It is observed that the latter case leads to lower energy consumption for the same degree of uncertainty exhibited by the conditional entropy on the x-axis. The energy consumption for the latter case, when the threshold is 3 bits, is 31.61% relative to when the threshold is 1 bit. This is due to the fact that the barometer requires approximately $\frac{1}{3}^{rd}$ the energy compared to the accelerometer in normal modes of operation.

Figure 10:
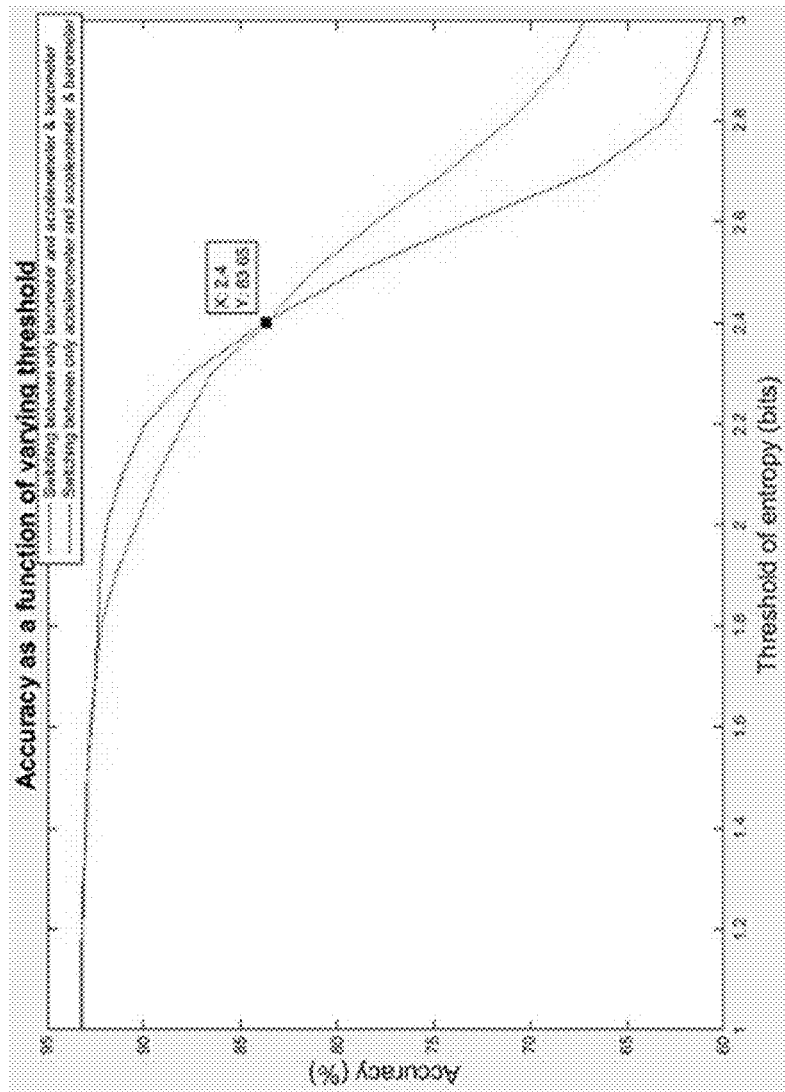
FIG. 10 is a graph showing a comparison of classification accuracy as a function of threshold value for the conditional entropy switching criterion for two switching cases.

FIG. 10 gives a graphical comparison of classification accuracy as a function of the switching threshold in two cases: i) switching is done between just the accelerometer, and both accelerometer and barometer and, ii) switching is done between just the barometer, and both accelerometer and barometer. When the switching threshold is 2.4 bits, the accuracy of both the cases is the same i.e. approximately 83.65%. The energy consumed using the first sequence of sensors is 1.38 J, and the energy consumed using the second sequence of sensors is 1.19 J. The graph also shows that when threshold is less than 2.4 bits, greater classification accuracy can be obtained at the cost of lower energy consumption as the second sequence of sensor switching gives higher accuracy than the first sequence. When the switching threshold is more than 2.4 bits, higher accuracy can be obtained with more energy consumption.

Figure 11:
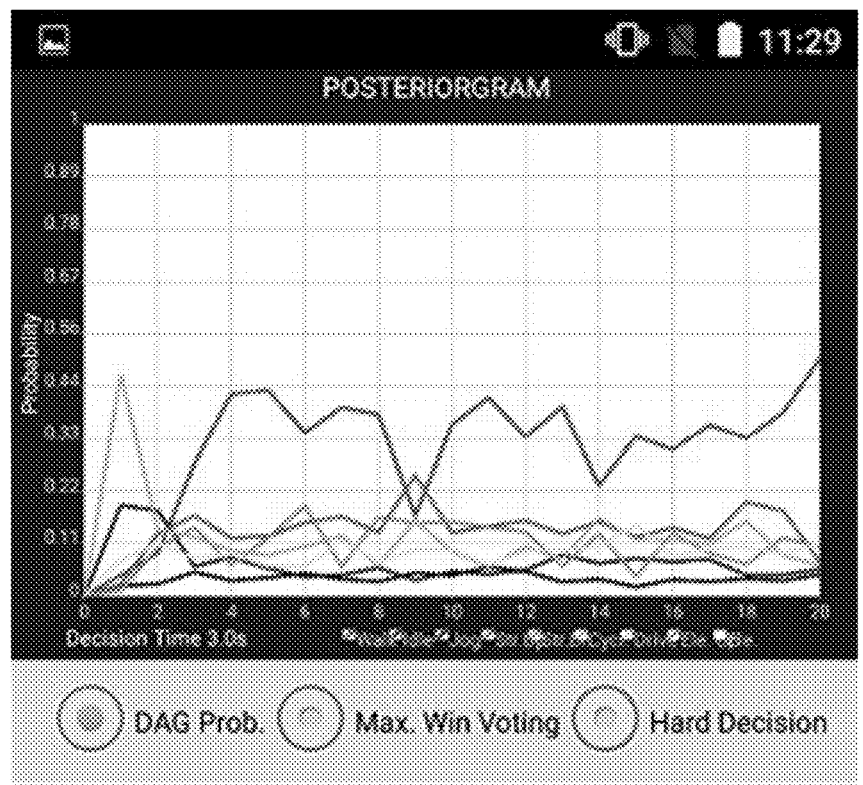
FIG. 11 is a screen shot of an Android application graphically displaying the posterior probabilities of various motion activity classes, the conditional entropy, and the duration for which each activity is performed, with only the accelerometer switched on. The user can choose between three different classification algorithms.
Figure 11:
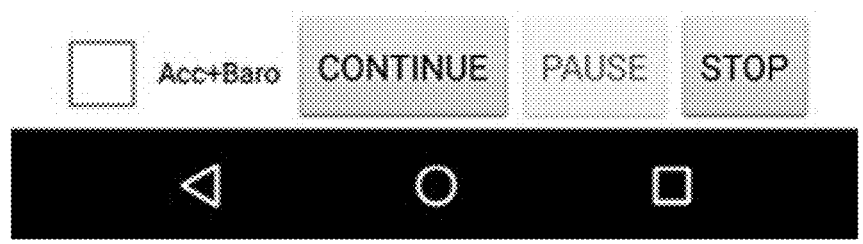

FIG. 11 shows a snapshot of an Android application in which the true motion activity is "walking". It gives the posterior probability output i.e. the MAP for the motion activities as a function of time in graphical form. The total duration for the activities as detected by the classifier is displayed in seconds. The conditional entropy at the given instant is also calculated and displayed. The switching between a single sensor and two sensors can be done using either the probability difference criterion or the conditional entropy criterion.

Figure 12:
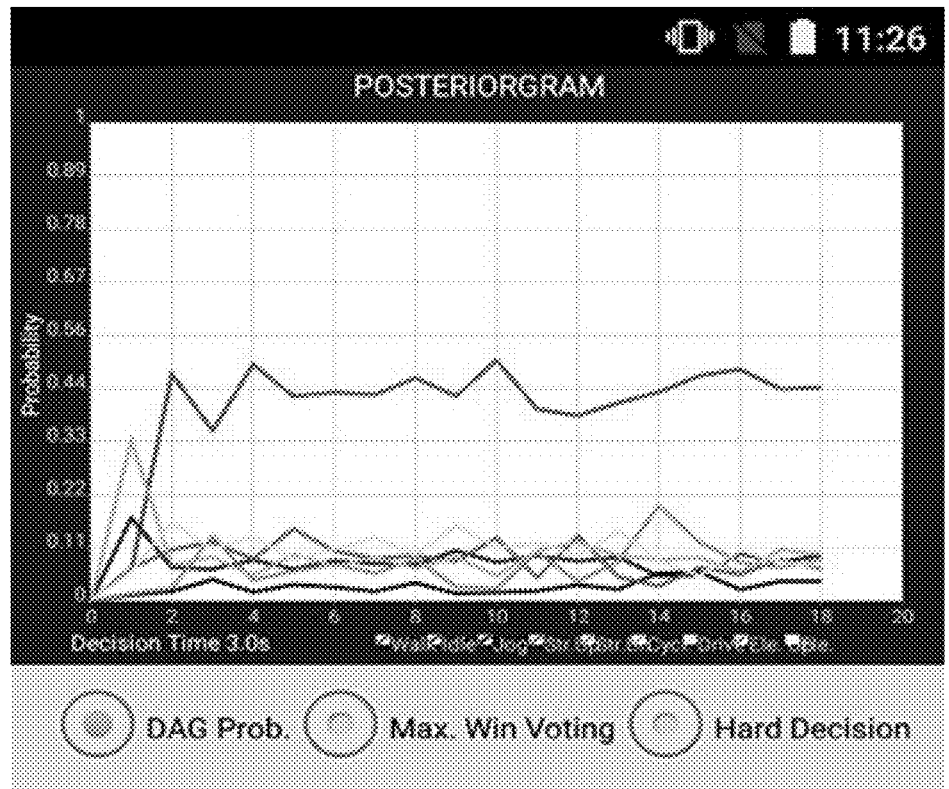
FIG. 12 is a screen of an Android application graphically displaying the posterior probabilities of various motion activity classes, the conditional entropy, and the duration for which each activity is performed since the start, with both the accelerometer and barometer switched on. The user can choose between three different classification algorithms.

Likewise, FIG. 12 shows a snapshot of the Android application displaying the motion activity posteriorgram, the total duration for all the activities as detected by the classifier and the conditional entropy for the motion activity "walking" when both accelerometer and barometer sensors switched on.

It should be noted that the techniques described herein improve context determination and activity tracking technology itself, providing acceptable accuracy while reducing power consumption.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. A sensor chip mounted on a printed circuit board (PCB) and electrically coupled to a system on chip (SoC) mounted on the PCB via at least one conductive trace, the sensor chip comprising:
first and second sensing devices; and
a control circuit configured to:
activate the first sensing device;
determine a first probabilistic context of an electronic device into which the sensor chip is incorporated relative to its surroundings, wherein the first probabilistic context comprises probabilities that a mode of movement of a user carrying the electronic device is each of a plurality of modes of movement;
output the first probabilistic context;
determine a confidence measure of the first probabilistic context;
where the confidence measure of the first probabilistic context is below a first threshold:
activate the second sensing device;
determine a second probabilistic context of the electronic device relative to its surroundings;
output the second probabilistic context; and
determine a confidence measure of the second probabilistic context;
wherein the control circuit determines confidence measure of the first probabilistic context by:
determining a difference between a highest of the probabilities and a second highest of the probabilities; and
determining the confidence measure of the first probabilistic content as a function of the determined difference; and
where the confidence measure of the second probabilistic context is above a second threshold, deactivate the second sensing device and return to determining the first probabilistic context.

2. The sensor chip of claim 1, wherein the first threshold and second threshold are equal.

3. The sensor chip of claim 1, wherein the first threshold and second threshold are unequal.

4. The sensor chip of claim 1, further comprising a third sensing device; and wherein the control circuit is further configured to:
   where the confidence measure of the second probabilistic context is below the first threshold:
      activate the third sensing device;
      determine a third probabilistic context of the electronic device relative to its surroundings;
      output the third probabilistic context; and
      determine a confidence measure of the third probabilistic context; and
   where the confidence measure of the third probabilistic context is above the second threshold, deactivate the third sensing device and return to determining the second probabilistic context.

5. The sensor chip of claim 1, wherein the control circuit is further configured to, where the confidence measure of the second probabilistic context is below the first threshold, return to determining the second probabilistic context.

6. The sensor chip of claim 1, wherein the control circuit outputs the first probabilistic context to the SoC.

7. The sensor chip of claim 1, wherein the control circuit is configured to deactivate the first sensing device when activating the second sensing device.

8. The sensor chip of claim 1, wherein the control circuit is configured to maintain activation of the first sensing device when activating the second sensing device.

9. The sensor chip of claim 1, wherein the second threshold is a level above which accuracy of the first or second probabilistic context is at least 80%.

10. The sensor chip of claim 1, wherein first the threshold is approximately 60%.

11. A sensor chip mounted on a printed circuit board (PCB) and electrically coupled to a system on chip (SoC) mounted on the PCB via at least one conductive trace, the sensor chip comprising:
   first and second sensing devices; and
   a control circuit configured to:
      activate the first sensing device;
      determine a first probabilistic context of an electronic device into which the sensor chip is incorporated relative to its surroundings;
      output the first probabilistic context;
      determine a confidence measure of the first probabilistic context;
      where the confidence measure of the first probabilistic context is below a first threshold:
         activate the second sensing device;
         determine a second probabilistic context of the electronic device relative to its surroundings;
         output the second probabilistic context; and
         determine a confidence measure of the second probabilistic context; and
      where the confidence measure of the second probabilistic context is above a second threshold, deactivate the second sensing device and return to determining the first probabilistic context; and
   wherein the second probabilistic context comprises probabilities that a mode of movement of a user carrying the electronic device is each of a plurality of modes of movement; and wherein the control circuit determines confidence measure of the second probabilistic context by:
      determining a difference between a highest of the probabilities and a second highest of the probabilities; and
      determining the confidence measure of the second probabilistic content as a function of the determined difference.

12. The sensor chip of claim 11, wherein the control circuit also determines the confidence measure of the first probabilistic context as a function of conditional entropy of the first probabilistic context.

13. The sensor chip of claim 11, wherein the control circuit also determines the confidence measure of the second probabilistic context as a function of conditional entropy of the second probabilistic context.

14. The sensor chip of claim 11, wherein the first threshold is set based on a desired level of probabilistic context accuracy.

15. The sensor chip of claim 1, wherein the control circuit also determines the confidence measure of the first probabilistic context as a function of conditional entropy of the first probabilistic context.

16. The sensor chip of claim 1, wherein the control circuit determines the confidence measure of the second probabilistic context as a function of conditional entropy of the second probabilistic context.

17. The sensor chip of claim 1, wherein the first threshold is set based on a desired level of probabilistic context accuracy.

18. The sensor chip of claim 17, wherein the control circuit receives the desired level of probabilistic context accuracy from the SoC.

19. The sensor chip of claim 1, wherein the first threshold is set based as a function of minimum power consumption required to achieve a desired level of probabilistic context accuracy.

20. The sensor chip of claim 1, wherein the control circuit is configured to place the first sensing device into a low power mode when activating the second sensing device; and wherein the control circuit is configured to place the second sensing device into a low power mode when activating the first sensing device.

21. A method of operating an electronic device, comprising:
   activating a first sensing device;
   determining a first probabilistic context of the electronic device relative to its surroundings, wherein the first probabilistic context comprises probabilities that a mode of movement of a user carrying the electronic device is each of a plurality of modes of movement;
   outputting the first probabilistic context;
   determining a confidence measure of the first probabilistic context;
   wherein the confidence measure of the first probabilistic context is determined by:
      determining a difference between a highest of the probabilities and a second highest of the probabilities; and
      determining the confidence measure of the first probabilistic content as a function of the determined difference;
   where the confidence measure of the first probabilistic context is below a threshold:
      activating a second sensing device;
      determining a second probabilistic context of the electronic device relative to its surroundings, wherein the second probabilistic context comprises probabilities that a mode of movement of a user carrying the electronic device is each of a plurality of modes of movement;
      outputting the second probabilistic context;

determining a confidence measure of the second probabilistic context;
wherein the confidence measure of the second probabilistic context is determined by:
  determining a difference between a highest of the probabilities and a second highest of the probabilities; and
  determining the confidence measure of the second probabilistic content as a function of the determined difference;
where the confidence measure of the second probabilistic context is above the threshold, deactivating the second sensing device and return to determining the first probabilistic context.

22. The method of claim 21, further comprising, where the confidence measure of the second probabilistic context is below the threshold:
  activating a third sensing device;
  determining a third probabilistic context of the electronic device relative to its surroundings;
  outputting the third probabilistic context;
  determining a confidence measure of the third probabilistic context; and
  where the confidence measure of the third probabilistic context is above the threshold, deactivating the third sensing device and return to determining the second probabilistic context.

23. The method of claim 21, further comprising deactivating the first sensing device when activating the second sensing device.

24. The method of claim 21, further comprising maintaining activation of the first sensing device when activating the second sensing device.

25. The method of claim 21, wherein the confidence measure of the first probabilistic context is also determined as a function of conditional entropy of the first probabilistic context; and wherein the confidence measure of the second probabilistic context is determined as a function of conditional entropy of the second probabilistic context.

26. The method of claim 21, wherein the threshold is set based on a desired level of probabilistic context accuracy.

27. The method of claim 21, wherein the threshold is set based as a function of minimum power consumption required to achieve a desired level of probabilistic context accuracy.

28. The method of claim 21, wherein the first sensing device is placed into a low power mode when activating the second sensing device; and wherein the second sensing device is placed into a low power mode when activating the first sensing device.

29. The method of claim 21, wherein the confidence measure of the first probabilistic context is an indicator of a likely correctness of the first probabilistic context; and wherein the confidence measure of the second probabilistic context is an indicator of likely correctness of the second probabilistic context.

* * * * *